Dec. 24, 1929.　　　G. GARVIS　　　1,740,729
BARBECUE MACHINE
Filed Dec. 27, 1927
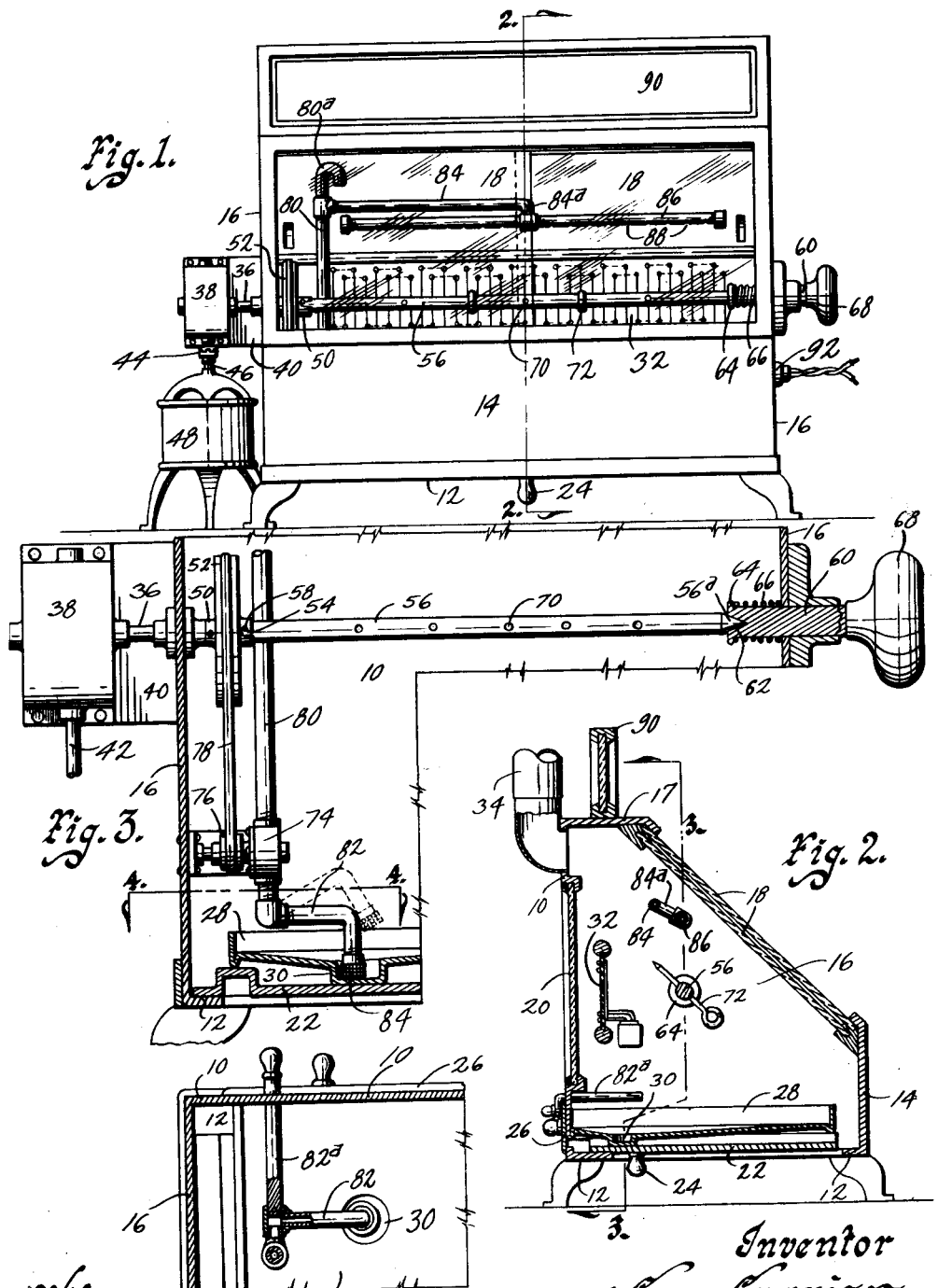
Witness
Vinton
Read
Inventor
Gus Garvis
by Bair & Freeman Attorneys Patented Dec. 24, 1929

1,740,729

UNITED STATES PATENT OFFICE

GUS GARVIS, OF DES MOINES, IOWA

BARBECUE MACHINE

Application filed December 27, 1927. Serial No. 242,601.

The object of my invention is to provide a barbecue machine of simple, durable and inexpensive construction.

More particularly, it is my object to provide a barbecue machine in which means are provided for mounting the meat on a spit adjacent to a heater or cooker element in such manner that the spit may be rotated for cooking the meat.

It is a further object of my invention in this connection to pro..de such a machine having a transparent casing, so that the whole cooking operation may be readily visible and the device may be set in a front window or in some other position, where it will be convenient for display and advertising purposes.

Still another object is to provide such a device having a transparent casing, so arranged that the cooking meat will be free from dirt and dust.

A further purpose of the present invention is to provide a novel structure for mounting and rotating the spit shaft upon which the meat is supported.

Another and important purpose of my present invention is to provide in a machine of the kind described means for dropping meat juices and flavoring and the like in small but steadily supplied quantities over the cooking meat.

In making such a device, it is my purpose to provide above the meat spit a perforated distributing pipe and to supply the juices to said pipe from a drip pan below the meat by means of connecting pipes and a pump, and to further provide an upward extension on one of the supply pipes, open at its upper end, so that the juices will be supplied to the distributing pipe in steady and uniform quantities.

With these and other objects in view, my invention consists in the construction, arrangement and combination of the various parts of my barbecue machine, whereby the objects contemplated are attained, as hereinafter more fully set forth, pointed out in my claims, and illustrated in the accompanying drawings, in which:

Figure 1 shows a front elevation of a barbecue machine embodying my invention.

Figure 2 is a vertical, sectional view of the same taken on the line 2—2 of Figure 1.

Figure 3 is a detail, sectional view taken on the line 3—3 of Figure 2, part only of the shaft structure being shown in section; and Figure 4 is a detail, sectional view taken on the line 4—4 of Figure 3.

In the accompanying drawings, I have shown a casing. This casing has the rear wall frame 10, the bottom frame 12, a short upwardly extending front wall 14, end walls 16, a top or cover member 17 extending from the rear wall forwardly a short distance, and inclined sliding transparent doors 18, connecting the front of the top 17 with the upper part of the wall 14.

Inset in the rear frame 10 is a transparent pane or the like 20. A bottom member 22 has a downwardly extending handle 24 and is slidably mounted on the bottom frame 14 in such manner that by sliding it rearwardly an opening will be left at its front edge for the control of draft and ventilation.

In the rear frame 10 at the lower part thereof is an opening 24, for which there is provided a suitable door 26.

Resting on the bottom member 22 is a drip pan 28 having a lower portion 30, which serves to provide a sump for the purposes hereinafter more fully described.

Suitably mounted near the rear central portion of the casing thus formed is a heater, indicated at 32 in Figures 1 and 2. This heater may be of the type using electrical heating elements or may be a gas heater or otherwise as may be desired.

Communicating with the upper part of the casing is a ventilating pipe 34 for carrying off air and odors.

Mounted in one end wall 16 is a short shaft 36. This shaft extends into a gear casing 38 supported on a bracket 40 outside the main casing. In the gear casing 38 are reducing gears not here otherwise disclosed. Connected with the reducing gears and extending downwardly from the gear casing 38 is a shaft 42 connected through a clutch 44 with the shaft 46 of a motor 48.

Mounted on the inner end of the shaft 36 inside the main casing is a hub 50 of a belt pulley 52. The opposite end of the hub is tubular and has in its wall a bayonet joint slot 54, as shown in Figure 3.

I provide a spit shaft 56 having at one end the pin 58 adapted to be slipped into the bayonet slot 54. The other end of the spit shaft 56 is sharp as at 56ª.

Mounted in the opposite end of the casing is a short shaft 60 having at its inner end a socket 62 to receive the sharp end 56ª of the spit shaft. On the inner end of the short shaft 60 is an annular shoulder 64. On the shaft 60 between the shoulder 64 and the adjacent end 16 is a coil spring 66, which tends to normally hold the shaft 60 at the inner limit of its movement. The shaft 60 projects through the wall in which it is mounted and has on its outer end a knob 68, whereby the shaft 60 can be conveniently manipulated.

It will be seen that when the parts are assembled as shown in Figure 3, one of the doors 18 may be opened, the knob 68 may be grasped, and the shaft 60 moved to the right for releasing the right-hand end of the spit shaft 56. Thereupon the spit shaft 56 may be itself manipulated for releasing its other end from the hub 50.

The shaft 60 may be provided with a series of holes 70 to receive short spit pins 72.

It will be seen that one, two or three hams or other meat for barbecuing may be placed on the spit shaft 56, and that shaft may then be assembled in position as shown in Figure 3.

Thereupon, if the heater is started and the motor is operated, the spit shaft will be slowly rotated for properly cooking the meat. This cooking operation can be seen through the transparent parts of the main casing, yet the meat will be under proper sanitary conditions free from any dust or dirt in the atmosphere.

For dripping meat juices, flavoring and the like in liquid form over the cooking meat, I have provided the following means:

Supported on one of the end walls 16 is a pump 74. On the pump shaft is a pulley 76 aligned with the pulley 52. A belt 78 travels on these pulleys for operating the pump from the shaft 36.

The pump 74 is interposed in an upright pipe 80. Pivotally connected with the lower end of the pipe 80 is a take-up pipe 82 in the form of a right-angle having a strainer 84 on its take-up end. The take-up end of the pipe 82 may be dropped into the lower portion or sump 30 of the pan 28. Projecting from the pipe 82 in line with its pivot and extending through the rear wall of the casing is an operating rod or handle 82ª by which the pipe 82 can be manipulated.

Projecting from the upper part of the pipe 80 is a laterally projecting branch pipe 84, the inner end of which turns downwardly as at 84ª, and supports a pipe 86 above the spit shaft 56. The pipe 86 has a plurality of small holes or perforations 88 through which juices may drop downwardly upon the meat on the spit shaft.

The pipe 80 has above the pipe 84 a portion 80ª extended upwardly and formed with a down-turned end.

The purpose of the structure just described will now be referred to.

When the pump is operated from the shaft 36 the juices will be drawn from the drip pan through the take-up pipe 82, a portion of the pipe 80, the pump 74, forced into another portion of the pipe 80, and thence through the branch pipe 84 to the drip pipe 86, from which the juices will be dropped upon the meat on the spit shaft.

Owing to the fact that there is ordinarily some variation in the operation of the pump and to the further fact that it is desirable to furnish just the right amount of juices and not to soak the meat, I have provided the extension 80ª, so that if the pump should run a little too fast any surplus juices will be pumped through the extension 80ª and allowed to drop back into the drip pan.

This is an important feature of my present invention.

Changes may be made in the details of the construction and arrangement of the various parts of my barbecue machine without departing from the essential spirit and purpose of my invention, and it is my intention to cover by my claims any modified forms of structure or use of mechanical equivalents, which may be reasonably included within their scope.

I have shown in Figure 2 a sign 90 supported on the top 17 and in Figure 1 an electrical connection 92, which may be used in case an electrical heating element is employed.

I claim as my invention:

1. In a barbecue machine of the kind described, a casing, a heater therein, a meat holder for supporting meat for rotation adjacent to the heater, a drip pan having a low portion, a perforated element above the meat holder, means including piping and a pump for conducting juices from the pan to the perforated element, and an open pipe extending above said element.

2. In a barbecue machine of the kind described, a casing, a heater therein, a meat holder for supporting meat for rotation adjacent to the heater, a drip pan having a low portion, a perforated pipe extending lengthwise above the meat holder, a second pipe leading from the pan communicating with the first pipe and having an open end extending thereabove, and a pump for forcing juices through the second pipe.

3. In a barbecue machine of the kind described, a casing, a heater therein, a meat holder for supporting meat for rotation adjacent to the heater, a drip pan having a low portion, a perforated pipe extending lengthwise above the meat holder, a second pipe leading from the pan communicating with the first pipe and having an open end extending thereabove, and a pump for forcing juices through the second pipe actuated from said meat holder.

4. In a barbecue machine of the kind described, a casing, a heater therein, a meat holder for supporting meat for rotation adjacent to the heater, a drip pan having a low portion, a perforated pipe extended lengthwise above the meat holder, a second pipe having a swinging end adapted to be projected into the pan, and a portion communicating with the first pipe and having an open end extending thereabove, and a pump for forcing juices through the second pipe.

5. In a device of the class described, a casing having transparent front and rear members, the front member being a movable closure, a heater in the rear of said casing, a rotatable meat holder in front of said heater, the casing having a bottom with an adjustable part for controlling draft, a drip pan on the bottom, a door in the rear member for access to the pan, and a ventilator pipe leading from the upper part of the casing.

6. In a barbecue machine of the kind described, a casing, a heater therein, a meat holder for supporting meat for rotation adjacent to the heater, comprising a shaft projecting through the casing, a spit shaft, said shafts having coacting means for detachably non-rotatably connecting their adjacent ends, means for detachably journaling the other end of the spit shaft controllable from outside the casing, a drip pan below the meat holder, having a low portion for forming a sump, a perforated drip pipe extended lengthwise above said spit shaft, an upright pipe communicating with the drip pipe having an open end extended thereabove, a take-up pipe pivoted to the upright pipe, having an end adapted to be swung into said low portion, and a pump for forcing juice through said pipes from the pan.

7. In a barbecue machine of the kind described, a casing, a heater therein, a meat holder for supporting meat for rotation adjacent to the heater, comprising a shaft projecting through the casing, a spit shaft, said shafts having coacting means for detachably non-rotatably connecting their adjacent ends, means for detachably journaling the other end of the spit shaft controllable from outside the casing, a drip pan below the meat holder, having a low portion for forming a sump, a perforated drip pipe extended lengthwise above said spit shaft, an upright pipe communicating with the drip pipe having an open end extended thereabove, a take-up pipe pivoted to the upright pipe, having an end adapted to be swung into said low portion, and a pump for forcing juice through said pipes from the pan operated from said first shaft.

8. In a barbecue machine, a casing, a heater therein, a spit arranged in front of said heater to rotate on a horizontal axis, a drip pan below the spit, a horizontally arranged perforated pipe arranged above the spit to permit juices to drip on meat on the spit and having an intake end in the drip pan, means for rotating the spit, means actuated from said last means for pumping juices from said pan to said perforated pipe, and means for raising said intake end out of said drip pan and thereby rendering the pumping means inoperative without interfering with the operation of the spit.

9. In a barbecue machine of the kind described, a casing, a heater therein, a meat holder for supporting meat for rotation adjacent to the heater, a drip pan having a low portion, a perforated pipe extended lengthwise above the meat holder, a second pipe having a swinging end adapted to be projected into the pan, and a portion communicating with the first pipe, and a pump for forcing juices through the second pipe.

10. In a barbecue machine, an enclosed casing, a heater therein, a spit arranged within said casing in front of said heater to rotate on a horizontal axis, a drip pan below the spit, means for taking juices from the drip pan and controlling distribution of such juices in finely divided parts over food products arranged along the spit for thus basting as many articles as the spit will hold and overflow means to prevent flooding of the distribution means.

Des Moines, Iowa, December 17, 1927.
GUS GARVIS.